United States Patent
Hymel

(10) Patent No.: US 6,216,015 B1
(45) Date of Patent: Apr. 10, 2001

(54) WIRELESS SUBSCRIBER UNIT AND METHOD FOR MANAGING SMART CARD DATA

(75) Inventor: James Allen Hymel, Lake Worth, FL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/244,145

(22) Filed: Feb. 4, 1999

(51) Int. Cl.⁷ .................................................. H04B 1/38
(52) U.S. Cl. ........................ 455/558; 455/412; 379/357
(58) Field of Search .................... 455/558, 412, 455/414, 410, 411, 466, 553, 550, 90, 575, 554–557, 566, 418, 419, 420, 463, 564; 379/356, 355, 357, 144; 340/825.44; 235/380, 382, 382.5, 492; 755/463, 564

(56) References Cited

U.S. PATENT DOCUMENTS

| | | | |
|---|---|---|---|
| 5,266,782 | * 11/1993 | Alanara et al. | 235/380 |
| 5,353,328 | * 10/1994 | Jokimies | 455/558 |
| 5,371,493 | 12/1994 | Sharpe et al. | 340/825.34 |
| 5,687,216 | * 11/1997 | Svennson | 455/412 |
| 5,770,849 | 6/1998 | Novis et al. | 235/492 |
| 5,875,404 | * 2/1999 | Messiet | 455/558 |
| 5,884,168 | * 3/1999 | Kolev et al. | 455/432 |
| 5,913,175 | * 6/1999 | Pinault | 455/558 |
| 5,915,226 | * 6/1999 | Martineau | 455/558 |
| 5,933,773 | * 8/1999 | Barvesten | 455/411 |
| 6,011,976 | * 1/2000 | Michaels et al. | 455/466 |
| 6,052,604 | * 4/2000 | Bishop, Jr. et al. | 455/558 |
| 6,119,020 | * 9/2000 | Miller et al. | 455/558 |
| 6,131,040 | * 10/2000 | Knuutila et al. | 455/550 |

* cited by examiner

Primary Examiner—Nay Maung
Assistant Examiner—Charles Craver
(74) Attorney, Agent, or Firm—Randi L. Dulaney

(57) ABSTRACT

A wireless subscriber unit (30) includes a memory manager (46) capable of communicating with a plurality of smart cards (44). The memory manager (46) is programmed to allocate a memory segment (48) to each smart card (44) when it is operatively connected to an interface (42) of the wireless subscriber unit (30). The memory manager (46) communicates with the smart card (44) to update data (50) stored in the memory segment (48).

6 Claims, 5 Drawing Sheets

WIRELESS SUBSCRIBER UNIT AND METHOD FOR MANAGING SMART CARD DATA

FIELD OF THE INVENTION

This invention relates in general to wireless subscriber units, and in particular to wireless subscriber units with smart card interfaces.

BACKGROUND OF THE INVENTION

A smart card is an electronic device typically including a microprocessor unit and a memory suitable for encapsulation within a small flexible plastic card, for example, one that is about the size of a credit card. The smart card additionally includes some form of interface for communicating with an external device or system. The applications for such smart cards include the transfer of a variety of information. Example applications include information relative to banking, transportation, subscriber, health, and identification.

Recently, the increased availability of smart cards coupled with consumers' desire to receive anytime, anywhere access to financial information, e-commerce goods and services and instant electronic cash is creating a strong interest in the coupling of smart cards with wireless subscriber units. Consolidating products, for example having wireless functionality along with smart card intelligence in one product, creates an effective and efficient way for consumers to manage their business and personal lives.

Multiple application capability is seen as the key to widespread adoption of smart cards integrated into wireless subscriber units. Today's technology allows smart cards to share the ability to interface with a wireless subscriber unit and send and receive file sharing data from the wireless subscriber unit. This makes a common interface possible. However, each of the smart cards may have its own specific set of intelligence. For example, the category of data, the communication protocol of the data, and size of the data packets from one smart card may differ greatly from that of another smart card. The data for an electronic commerce smart card may include communication through a decryption process and receipt of message on a secure channel; whereas the data for a sports service smart card may not.

One drawback of today's wireless subscriber units having the capability of interfacing with smart cards is the inability to manage separately the various sets of intelligence of multiple smart card applications. Today, when a wireless subscriber unit interfaces with a first smart card, it stores that first data in memory. Then, when the wireless subscriber unit interfaces with a second smart card, it may override the data stored from the first smart card application with the data from the second smart card application, thus making it difficult to manage multiple smart card applications. For example, sports scores overriding a checkbook balance would not be acceptable to a consumer.

Thus, what is needed is an efficient method of management of data and information downloaded from multiple smart cards to an individual wireless subscriber unit.

DESCRIPTION OF THE PREFERRED EMBODIMENT

Figure 1:
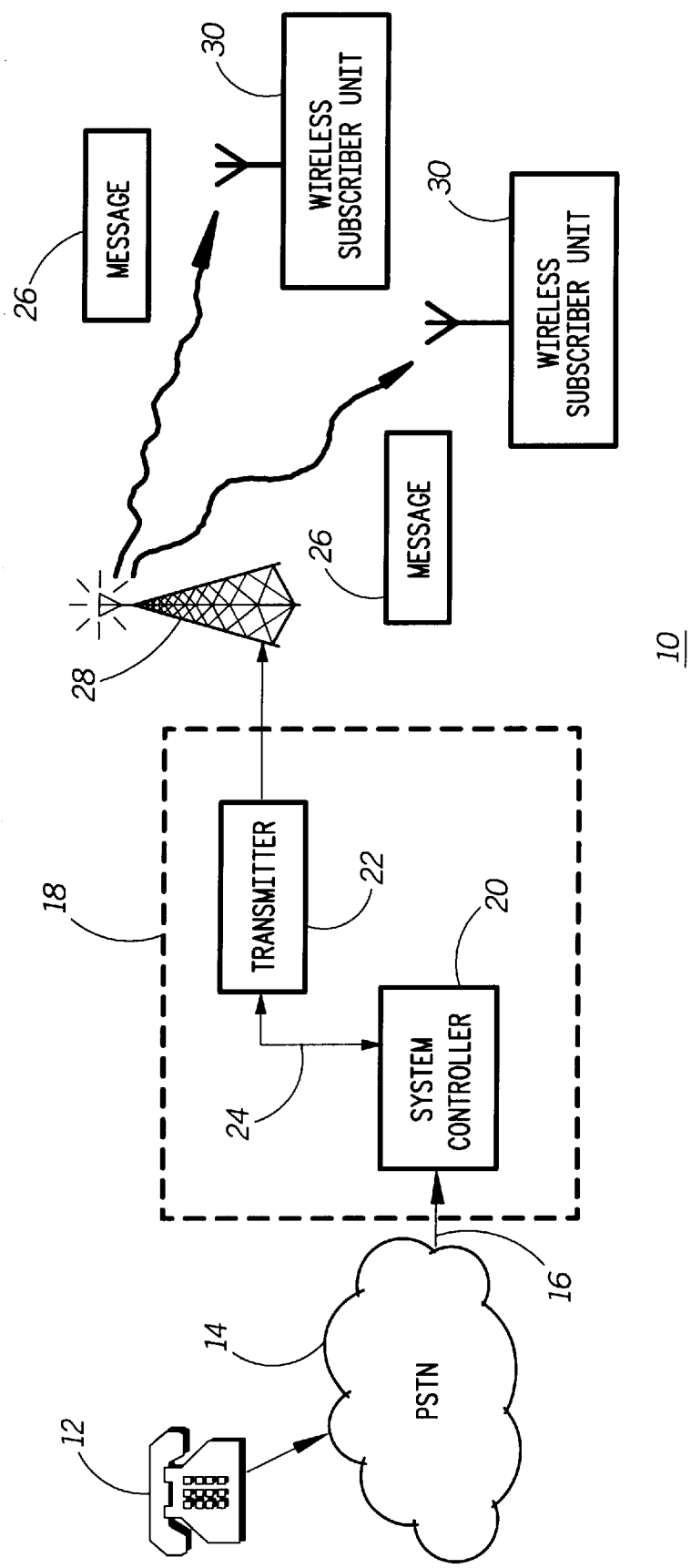
FIG. 1 is a block diagram of a wireless communication system.

Referring to FIG. 1, a block diagram of a wireless communication system 10 is shown. The wireless communication system 10 comprises a message input device, such as a telephone 12 connected through a conventional switched telephone network (PSTN) 14 by conventional telephone links 16 to a transmission source 18.

The transmission source 18 includes a system controller 20 and at least one system transmitter 22. The system controller 20 oversees the operation of the system transmitter 22 through one or more communication links 24, which typically are twisted pair telephone wires, and alternatively can include radio frequency (RF), microwave, or other high quality audio communication links. As is conventional, the system controller 20 encodes and decodes inbound and outbound telephone addresses into formats that are compatible with landline message switch computers. The system controller 20 also functions to digitally encode and schedule outbound messages such as a message 26, for transmission by the system transmitter 22 via the system transmit antenna 28 to a plurality of wireless subscriber units 30, on at least one outbound radio frequency (RF) channel.

It will be appreciated that the wireless communication system 10 may function utilizing any wireless RF channel, for example, a one or two way pager channel, a mobile cellular channel, or a mobile radio channel. Similarly, it will be appreciated that the wireless communication system 10 may function utilizing other types of channels such as infrared channels. In the following description, the wireless communication system 10 refers to any of the wireless communication systems mentioned above or an equivalent.

Each wireless subscriber unit 30 assigned for use in the wireless communication system 10 has an address assigned thereto which is a unique selective call address in the wireless communication system 10. The address enables the transmission of a message 26 from the system controller 20 only to the addressed wireless subscriber unit 30, and identifies the messages and responses received at the system controller 20 from the wireless subscriber unit 30. A list of the assigned addresses for each of the wireless subscriber units 30 is stored in the system controller 20 in the form of a subscriber database.

Figure 2:
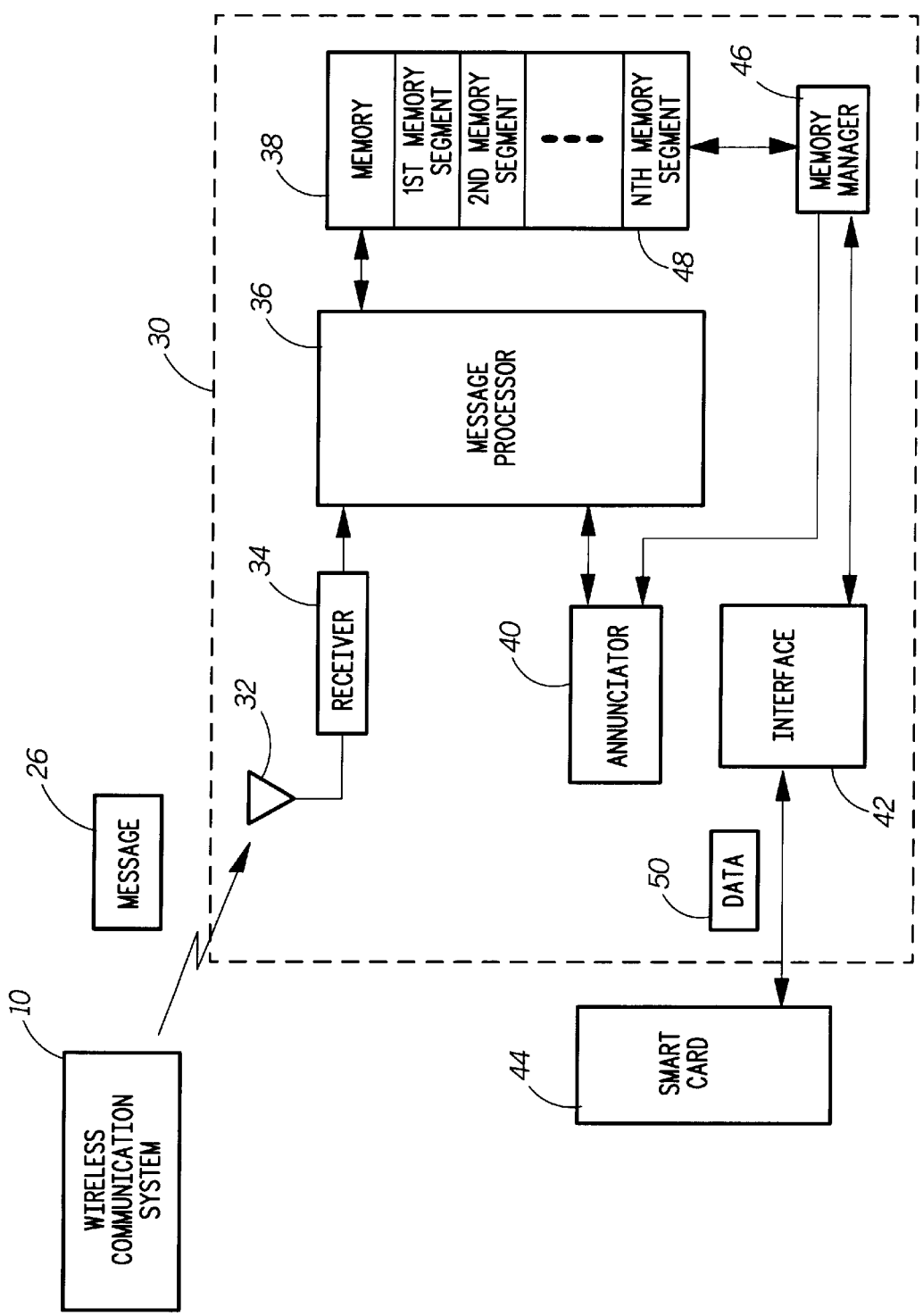
FIG. 2 is a block diagram of a wireless subscriber unit for operation within the wireless communication system of FIG. 1 in accordance with the invention.

FIG. 2 is a block diagram of the wireless subscriber unit 30 which operates within the wireless communication system 10 of FIG. 1. The wireless subscriber unit 30 includes an antenna 32 for intercepting transmitted signals of the wireless communication system 10. The antenna 32 is coupled to a receiver 34 employing conventional demodulation techniques for receiving the communication signals transmitted by the wireless communication system 10 such as the message 26. Signals received by the receiver 34 provide demodulated information, which is coupled to a message processor 36 for processing received messages.

To perform the necessary functions of the wireless subscriber unit 30, the message processor 36 is coupled to a memory 38 including a random access memory (RAM), a read-only memory (ROM), and an electrically erasable programmable read-only memory (EEPROM). In a preferred embodiment, the memory 38 is partitioned into a plurality of memory segments 48, each memory segment having an individual location in memory and an individual size.

Preferably, the message processor 36 is similar to the MC68328 microcontroller manufactured by Motorola, Inc. It will be appreciated that other similar processors can be utilized for the message processor 36, and that additional processors of the same or alternative type can be added as required to handle the processing requirements of the message processor 36.

The message processor 36 decodes an address in the demodulated data of the received message 26, compares the decoded address with one or more addresses stored in the memory 38, and when a match is detected, proceeds to process the remaining portion of the message 26. Once the message processor 36 has processed the message 26, it stores the message 26 in the memory 38. The message processor 36 also sends a command to an annunciator 40 to notify a user that a message 26 has been received. The annunciator 40 may be an audio alert (e.g. speaker or transducer) or a tactile alert (e.g. vibrator). It will be appreciated that other alerting mechanisms are also possible.

In a preferred embodiment, the wireless subscriber unit 30 includes an interface 42 for operatively connecting a smart card 44 to the wireless subscriber unit 30. The interface 42 may, for example, comprise a structure for physically engaging external contacts on the smart card 44 so that the smart card 44 is directly connected to the wireless subscriber unit 30. It will be appreciated by one skilled in the art that the interface 42 may also be a wireless connection such as an infrared or radio frequency interface.

The interface 42 connection is coupled to a memory manager 46 of the wireless subscriber unit 30. Preferably, the memory manager 46 is similar to the MC68328 microcontroller manufactured by Motorola, Inc. It will be appreciated that additional processors of the same or alternative type can be added as required to handle the processing requirements of the memory manager 46.

The memory manager 46 is programmed to connect the memory 38 and a data 50 stored on the smart card 44. When the memory manager 46 detects the connection of the smart card 44 to the interface 42, the memory manager 46 allocates a memory segment 48 to the smart card 44. Thereafter, any data 50 received from the smart card 44 will always be stored in its memory segment 48. The memory segment 48 is updated by the memory manager 46 in response to receipt of the data 50 from the smart card 44.

Partitioning the memory 38 to assign an individual memory segment 48 to an individual smart card facilitates the rapid communication between the wireless subscriber unit 30 and a plurality of smart cards. When a smart card is plugged into the interface, the identity of the smart card will automatically trigger the routing of its data to that individual memory segment. Partitioning the memory also allows the storage of data from multiple smart cards without the problem of new data from a new smart card overriding the already stored data from a different smart card.

Figure 3:
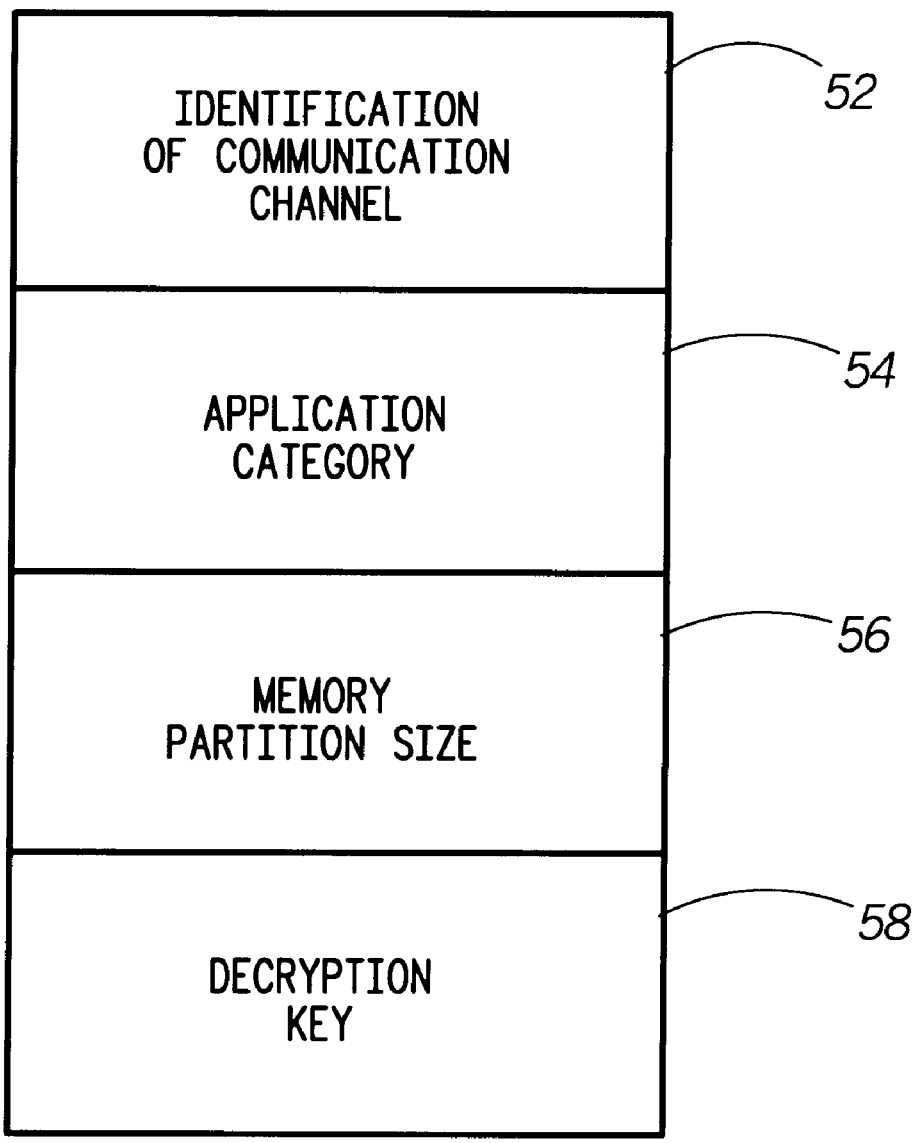
FIG. 3 illustrates typical data received by the wireless subscriber unit of FIG. 2.

FIG. 3 illustrates typical data sent from the smart card 44. The data 50, for example, may include an identification of a communication channel 52 for receipt of messages, or an application category 54 for organization of topical data, or a memory partition size 56 for segmentation of the memory. In applications such as electronic commerce and other financial applications, the data 50 may also include a decryption key 58 for security purposes. The memory manager 46 receives the information and updates or stores the information in the assigned memory segment 48. The message processor 36 accesses the memory segment 48 to retrieve this information and uses the information for processing received messages relating to the application of the smart card 44.

Preferably, the memory manager 46 sends a notification through the annunciator 40 when the memory segment 48 is full. A user, upon a notification alert, then plugs in the smart card 44 for downloading of the information in the memory segment 48, thus freeing up the memory segment 48 for further receipt of data.

Figure 4:
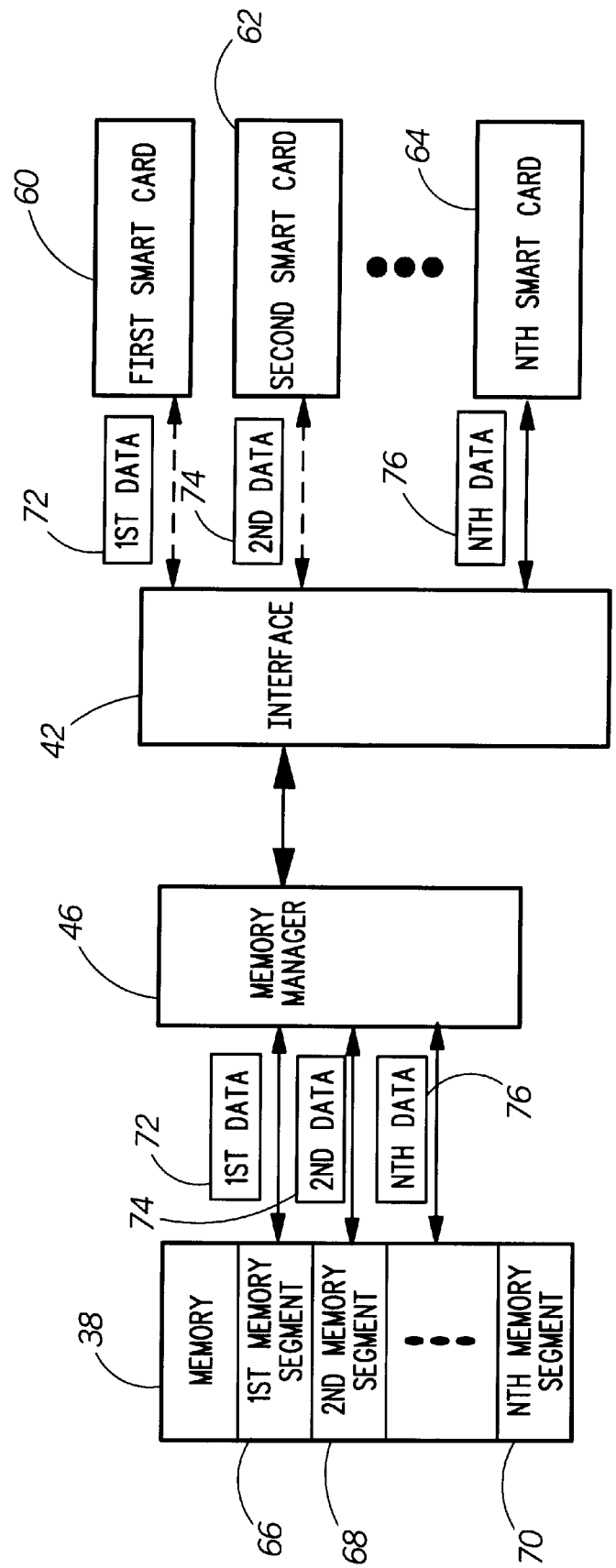
FIG. 4 is a functional block diagram of a preferred embodiment of the operation of the wireless subscriber unit of FIG. 2.

FIG. 4 is a functional block diagram of a preferred way that the memory manager 46 is programmed to manage data received from a plurality of smart cards. When one of the smart cards, 60, 62, or 64, is operatively connected to the interface 42, the memory manager 46 assigns an individual memory segment to the smart card, receives the data from the smart card, and stores the data received from that smart card into the individual memory segment. For example, when the first smart card 60 is plugged into the interface 42, the memory manager 46 receives and stores a first data 72 from the first smart card 60 into a first memory segment 66. Each time data is received from the first smart card 60 the memory manager 46 updates the first memory segment 66 accordingly. Similarly, when the second smart card 62 is plugged into the interface 42, the memory manager 46 receives and stores the second data 74 from the second smart card 62 into a second memory segment 68. This process of management of data from smart cards continues for an Nth smart card 64.

The memory manager 46, in one embodiment, communicates the location of the first memory segment to the first smart card in response to the first smart card being operatively connected to the wireless subscriber unit. The first smart card, thereafter, can rapidly download data to the first memory segment upon being operatively connected to the wireless subscriber unit. Data transfer rates are minimized in this manner.

In another embodiment, the memory manager 46 receives a required memory segment size from the smart card prior to assigning the memory segment to the smart card. This allows an efficient utilization of the available memory through dynamic allocation of memory as required.

The intelligence programmed into the memory manager 46 to receive and maintain separate memory segments for each pluggable smart card allows the wireless subscriber unit 30 to efficiently manage multiple applications from multiple sources without overriding information of one application when another application is being utilized. This management approach not only facilitates organization of data, it also speeds up the processing time of the data. When data is received from a smart card, it can be quickly routed to the correct memory segment and can be quickly retrieved by the message processor 36 when a message is received relating to a particular smart card application.

Figure 5:
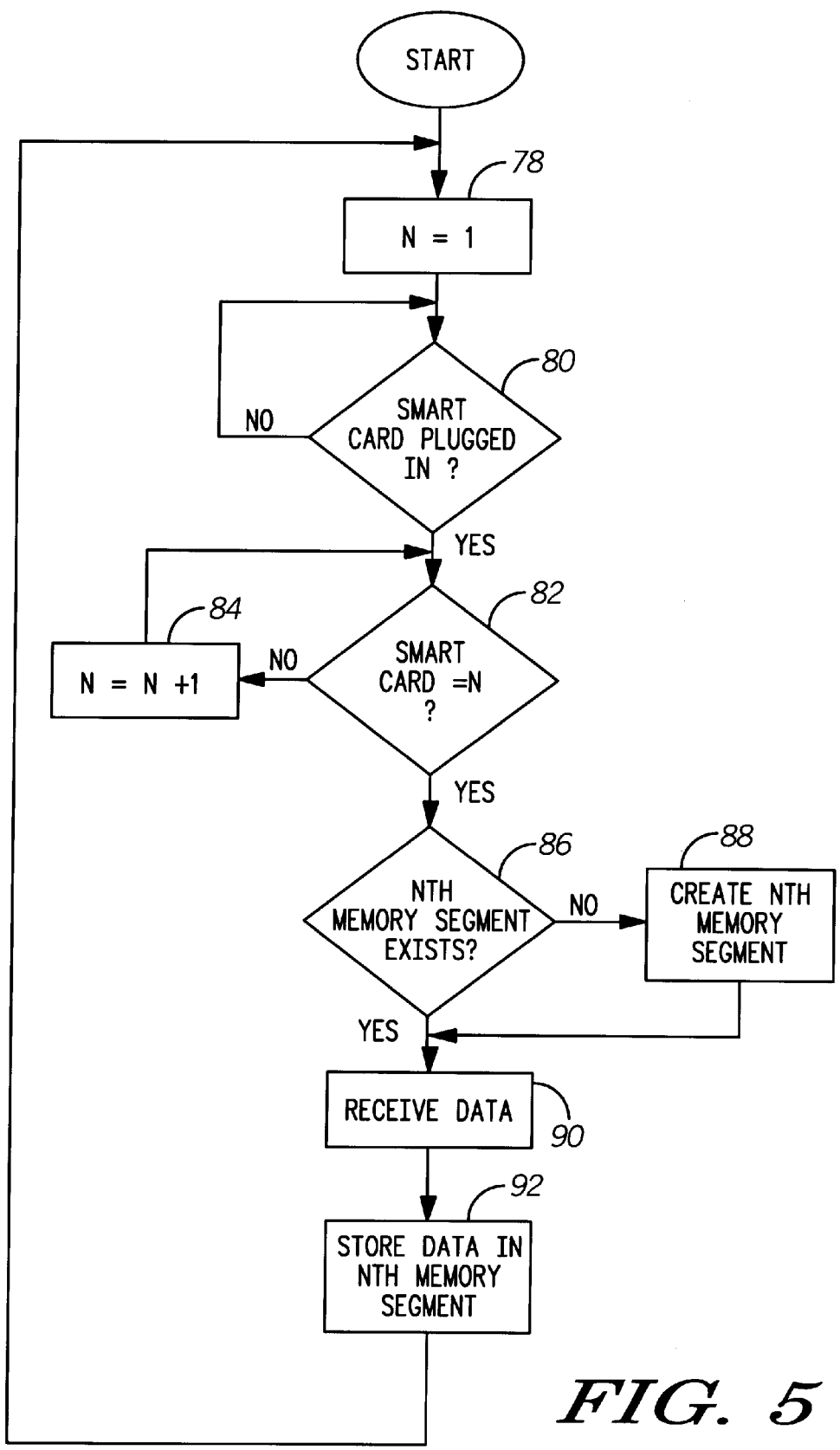
FIG. 5 is a flow chart illustrating the operation of the wireless subscriber unit of FIG. 2.

FIG. 5 is a flow chart illustrating how the memory manager 46 is preferably programmed in accordance with the invention. Referring to FIG. 4 and FIG. 5 together, in step 78, a counter N is set to one. In step 80, the memory manager 46 checks for a smart card 44 plugged into the interface 42. If there is no smart card 44 plugged into the interface 42, the memory manager 46 continues checking periodically. If there is a smart card 44 plugged into the interface 42, the memory manager 46 next, in step 82, checks if the smart card is the Nth smart card (starting with N=1). If the smart card is not the Nth smart card, N is incremented by one in step 84 and the memory manager 46 continues checking until a match is made. If the smart card is the Nth smart card, the memory manager 46 next, in step 86, interrogates the memory 38 for an Nth memory segment 70. If an Nth memory segment 70 does not exist, the memory manager 46 partitions the memory 38, creating an Nth memory segment in step 88. If an Nth memory segment 70 exists, in step 90 the memory manager 46 receives the Nth data 76 sent from the Nth smart card 64. The memory manager 46 then stores the Nth data 76 in the Nth memory segment 70 in step 92; and the process cycles back to the start, resetting the counter back to one in step 78.

This preferred programming algorithm creates a process for reading, storing, and updating information from multiple smart cards in the memory of a wireless subscriber unit that minimizes the use of the wireless subscriber unit's memory while maximizing the flexibility of the wireless subscriber unit to receive and process multiple applications from multiple smart cards.

Although the invention has been described in terms of preferred embodiments, it will be obvious to those skilled in the art that various alterations and modifications may be made without departing from the invention. Accordingly, it is intended that all such alterations and modifications be considered as within the spirit and scope of the invention as defined by the appended claims.

What is claimed is:

1. In a wireless subscriber unit for receiving a message from a wireless communication system, the wireless subscriber unit having a memory including a plurality of memory segments, the wireless subscriber unit further having an interface for connecting to and communicating with a smart card, a method for managing the data for a plurality of smart cards, comprising:

detecting the connection of a first smart card to the interface;

allocating a first memory segment to the first smart card in response to detecting the connection of the first smart card;

receiving a first data from the first smart card;

storing the first data in the first memory segment;

detecting the connection of a second smart card to the interface;

allocating a second memory segment to the second smart card in response to detecting the connection of the second smart card;

receiving a second data from the second smart card; and storing the second data in the second memory segment.

2. A method for managing the data for a plurality of smart cards as recited in claim 1, further comprising:

receiving a third data from the first smart card, and responding thereto by the wireless subscriber unit; and substituting the third data for the first data in the first memory segment.

3. A method for managing the data for a plurality of smart cards as recited in claim 1, wherein each memory segment includes a location, the method further comprising:

communicating the location of the first memory segment to the first smart card.

4. A method for managing the data for a plurality of smart cards as recited in claim 3, wherein the location of the first memory segment is communicated to the first smart card in response to the first smart card being operatively connected to the interface.

5. A method for managing the data for a plurality of smart cards as recited in claim 1, wherein each memory segment includes a memory segment size, the method further comprising:

receiving the first memory segment size from the first smart card in response to the first smart card being operatively connected to the interface.

6. A method for managing the data for a plurality of smart cards as recited in claim 1, wherein the wireless subscriber unit receives a first message on a first communication channel, and a second message on a second communication channel, and wherein the first data received from the first smart card includes a new first communication channel, the method further comprising:

updating the operation of the wireless subscriber unit to receive the first message on the new first communication channel.

* * * * *